(12) United States Patent  
Gassmann

(10) Patent No.: US 6,299,538 B1  
(45) Date of Patent: Oct. 9, 2001

(54) DIFFERENTIAL-SPEED-CONTROLLED TRANSMITTING COUPLING

(75) Inventor: Theodor Gassmann, Rochester, MI (US)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/472,417

(22) Filed: Dec. 27, 1999

(30) Foreign Application Priority Data

Dec. 30, 1998 (DE) .............................................. 198 60 532

(51) Int. Cl.[7] .................................................... F16D 3/80
(52) U.S. Cl. ..................... 464/26; 192/35; 192/103 F; 464/10; 464/42
(58) Field of Search ................................ 464/10, 45, 46, 464/42, 43, 26; 192/35, 103 F

(56) References Cited

U.S. PATENT DOCUMENTS

| 4,924,989 | 5/1990 | Füderman . |
| 5,690,201 | * 11/1997 | Gassman ........................... 192/103 F |
| 6,041,903 | * 3/2000 | Burns et al. ....................... 192/103 F |
| 6,076,646 | * 6/2000 | Burns ................................ 192/103 F |

FOREIGN PATENT DOCUMENTS

| 197 17 803 C1 | 10/1998 | (DE) . |
| 296 14 615 U1 | 11/1998 | (DE) . |
| 0 337 356 | 10/1989 | (EP) . |
| 2 623 581 | 5/1989 | (FR) . |
| 2284869 | * 6/1995 | (GB) . |
| 2 323 141 A | 9/1998 | (GB) . |
| 62-276664 | 8/1989 | (JP) . |
| 2-269632 | 9/1992 | (JP) . |

* cited by examiner

Primary Examiner—Lynne H. Browne  
Assistant Examiner—Aaron Dunwoody

(57) ABSTRACT

A coupling for transmitting torque between two parts which are rotatable relative to one another, which coupling comprises a friction coupling whose friction plates are each non-rotatably connected to the one and to the other of the parts which are rotatable relative to one another, having a pressure chamber which is filled with a highly viscous fluid and which is formed by a housing formed in one of the rotatable parts and by a displaceable piston sealed relative to said housing, and having a pump unit in which there rotates a conveying member connected to the other one of the rotatable parts, wherein a reservoir for a highly viscous fluid is provided in the housing, which reservoir is connected to the pump unit, wherein the pressure chamber is supplied by the pump unit and the piston loads the friction coupling and wherein the pump unit is provided in the form of an internally toothed rotor pump and the conveying member forms an externally toothed rotor which is concentrically connected to the other one of the parts which are rotatable relative to one another, and wherein an internally hollow gear constitutes a runner which is eccentrically supported and is dragged along by the externally toothed rotor, with the rotor together with the hollow gear, forming a rotating pump chamber.

18 Claims, 5 Drawing Sheets

DIFFERENTIAL-SPEED-CONTROLLED TRANSMITTING COUPLING

BACKGROUND OF THE INVENTION

The invention relates to a coupling for transmitting torque between two parts which are rotatable relative to one another, which coupling comprises a friction coupling whose friction plates are each non-rotatably connected alternately to the one or to the other of the two parts which are rotatable relative to one another, having a pressure chamber which is filled with a highly viscous fluid and which is formed by a housing formed in one of the rotatable parts and by a displaceable piston sealed relative to said housing, and having a pump unit in which there rotates a conveying member connected to the other one of the rotatable parts, wherein a reservoir for a highly viscous fluid is provided in the housing, which reservoir is connected to the pump unit, and wherein the pressure chamber is supplied by the pump unit and wherein the piston loads the friction coupling.

Couplings of said type can be used as locking devices in axle differentials or central differentials, with axle differential, in the present context, meaning the conventional differential drive between the wheels of a driven vehicle axle, which differential drive is driven by a propeller shaft, and with central differential meaning the differential drive between two driven axles of a motor vehicle, which differential drive is driven by an intermediate driveshaft. In addition, couplings of said type can be used directly in a propeller shaft for a drive axle which is driven when required and which is torque-loaded only in the case of slip at a permanently driven drive axle. Couplings of said type are known, in particular, to have fluid shear pumps of the Visco-Lok® type as actuating elements. The fluid shear pumps used in said couplings, in view of the design principle, can only generate a limited volume flow which, with an increasing pressure, decreases towards zero even if there are no leakages. The volume flow of the fluid shear pumps can be increased by a wider or deeper shear channel. However, in view of the space restrictions, such an increase has its limits. The Visco-Lok® couplings provide soft connecting characteristics which are advantageous in avoiding engaging impacts and torque peaks, for example when used in pick-up vehicles and off-highway vehicles and which benefit the braking stability of the vehicle. For applications involving high demands regarding the reaction speed, the volume flow generated by the fluid shear pumps of Visco-Lok® couplings is not always sufficient.

SUMMARY OF THE INVENTION

It is therefore the object of the invention to provide a coupling of said type which comprises the advantages of the Visco-Lok® couplings and does not feature any restrictions regarding the reaction speed. The objective is achieved in a coupling for transmitting torque and comprising first and second parts which are rotatable relative to one another, and further comprising a friction coupling whose friction plates are each non-rotatably connected alternately to the one or the other of said first and second rotatable parts, and a pressure chamber which is filled with a highly viscous fluid and which is formed by a housing formed in one of the rotatable parts and by a displaceable piston sealed relative to said housing, and further comprising a pump unit in which there rotates a conveying member connected to the other one of the rotatable parts, wherein a reservoir for said highly viscous fluid is provided in the housing, said reservoir being connected to said pump unit, and wherein said pressure chamber is supplied by said pump unit and wherein said piston loads said friction coupling, wherein the pump unit is provided in the form of an internally toothed rotor pump and the conveying member forms an externally toothed rotor which is concentrically connected to the other one of the parts which are rotatable relative to one another, and an internally toothed hollow gear constitutes a runner which is eccentrically supported and is dragged along by the externally toothed rotor, with the rotor together with the hollow gear forming a rotating pump chamber, and wherein the pump chamber of the rotor pump is laterally delimited by an end face of a reversing and guiding element on one side and by an end face of a sealing disc on the other side, and, by means of fluid friction forces, the reversing and guiding element is rotatable to a limited extent between two end positions relative to the one of the two parts rotatable relative to one another, and a pressure channel connects the pump chamber to the pressure chamber and a return line connects the pressure chamber to the reservoir.

While using the major characteristics of the Visco-Lok® coupling, i.e., a sealed system filled with a highly viscous fluid, the inventive type of pump is an internally toothed pump which meets the named objective. The advantage of the Visco-Lok® coupling having a negligible influence of temperature is maintained, as is the advantage of a hermetically sealed, maintenance-free and autonomously functioning system. In this case, by using a reversing element, the pump units also build up pressure independently of the direction of relative rotation between the two parts rotatable relative to one another, with a highly viscous fluid being guided directly into the pressure chamber for the purpose of displacing the piston.

According to a preferred embodiment, it is proposed that in the housing or in the reversing and guiding element, there are provided two C-shaped channels which, on the one hand, act as suction channel and, on the other hand, as pressure channel of the rotor pump, and that there are provided a connecting bore in the housing between the reservoir and the channels and a pressure channel in the housing between the channels and the pressure chamber and that in each of the two end positions of the reversing and guiding element, alternately, one of the channels is connected to the connecting bore and the other channel is connected to the pressure channel.

In a way that is known in itself, the C-shaped channels are designed to be symmetrical relative to the eccentricity of the runner bearing and are openly connected to the pump chamber. The two C-shaped channels are preferably provided in the form of through-holes or slots in the reversing and guiding element which are directly connected to the connecting bore(s) and the pressure channel. The two C-shaped channels can also be provided in the form of surface grooves in the housing, with the connection with the connecting bore(s) and the pressure channels being provided substantially by corresponding channels in the reversing and guiding element. The pressure channel is preferably provided by a groove in the end face of the pressure chamber.

Further structural design characteristics consist in that the means for supporting the hollow gear are provided in the form of an eccentric inner cylindrical face in the reversing and guiding element, which is supported centrally relative to the housing. The quantity of viscous medium conveyed corresponds to a multiple of the quantity conveyed in prior art Visco-Lok® pumps, so that said reaction speed can be increased accordingly. The pump characteristics can easily be set by dimensioning the return bore leading to the reservoir. It is possible to provide elements in the return bore which compensate for the effect of temperature. Further preferred embodiments are described hereunder in further sub-claims.

BRIEF DESCRIPTION OF THE DRAWINGS

The present invention will be better understood by reading the detailed description thereof with reference to the drawings, of which.

DETAILED DESCRIPTION OF THE PREFERRED EMBODIMENT

Figure 1:
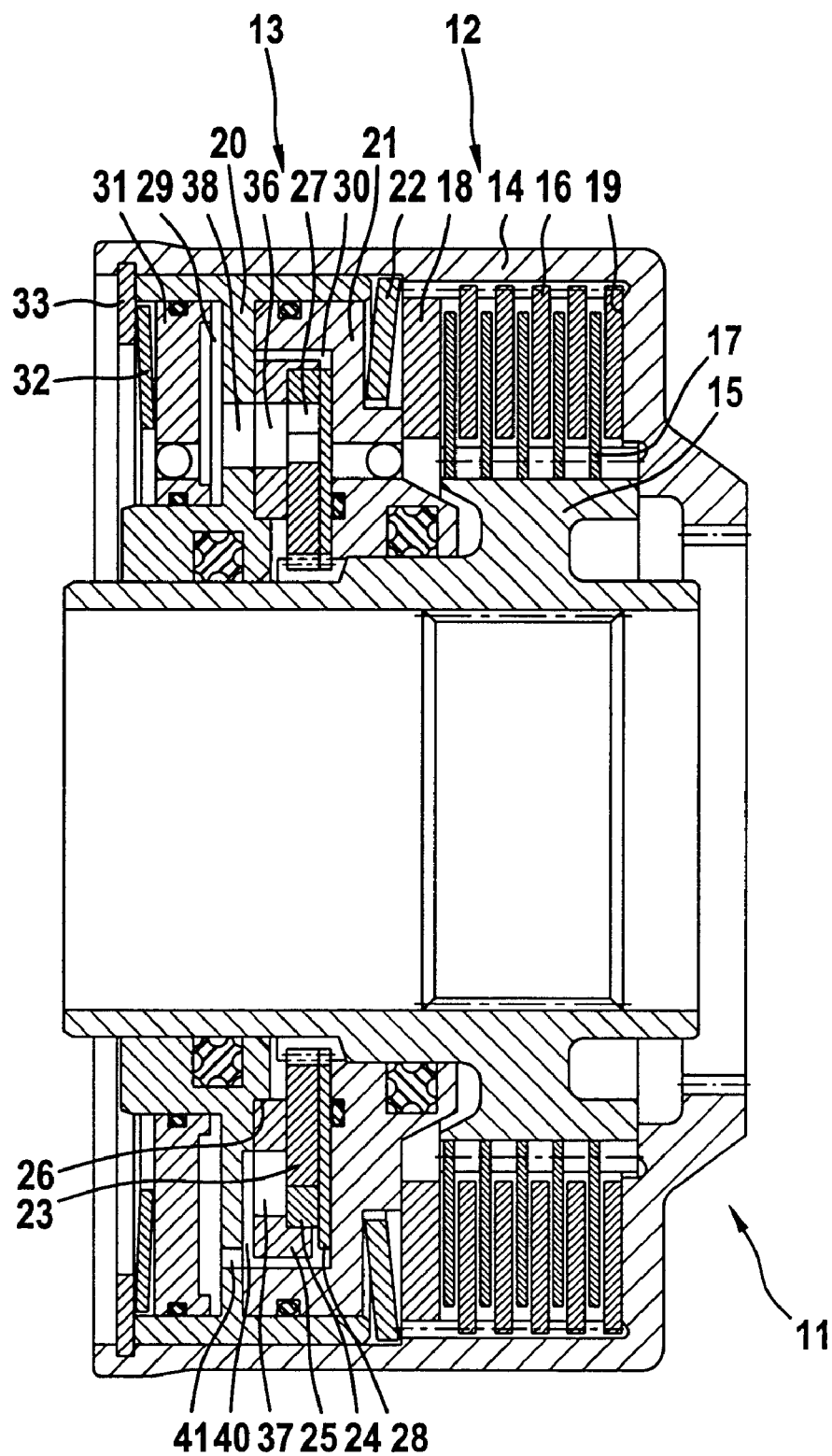
FIG. 1 is a longitudinal section through a first embodiment of an inventive coupling assembly.

FIG. 1 shows a coupling assembly 11 with a multi-plate coupling 12 and an actuating device 13. The coupling assembly 11 comprises a housing 14 and a hub 15 which constitute the two parts which are rotatable relative to one another. Outer plates 16 of the friction coupling 12 are non-rotatably held in the housing 14. Inner plates 17 of the friction coupling 12 are non-rotatably held on the hub 15. A pressure plate 18 is able press the plate package against a stop face 19 in the housing 14 (closing of the coupling). The actuating device 13 comprises a pump housing 20 which is firmly connected to the housing 14, and a piston 21 which is axially moveable relative to the pump housing 20 and which can load the pressure plate 18. The piston 21 can be returned by a plate spring 22 supported on the housing 14. In the pressure chamber 30 formed by the housing 20 and by the piston 21, there is provided an externally toothed rotor 23 which is non-rotatably connected to the hub 15 and which engages an eccentrically guided, internally toothed runner 24. The latter, by means of its cylindrical outer face, is guided in an eccentric inner recess of a reversing and guiding element 25 which is held on a centering step 26 of the pump housing 20 so as to be rotatable through a limited angular range. As is common with gear pumps of the type shown, the inner toothing of the runner 24 has one more tooth than the outer toothing of the rotor 23. The pump chamber 27 formed therebetween is closed by the reversing and guiding element 25 on the one hand and, on the other hand, by a sealing disc 28 which preferably rotates with the rotor 23. The pump chamber 27 is connected to a reservoir 29 in the pump housing 20 on the one hand and, on the other hand, to the pressure chamber 30 between the pump housing 20 and the piston 21, which connecting method will be described in greater detail. The reservoir 29 is formed by the pump housing 20 and by an annular piston 31 which is displaceable relative to the pump housing 20 and which is supported on the housing 14 by a plate spring 32 and a securing disc 33. There are provided the following channels in the pump housing 20 and in the reversing and guiding element 25 for connecting the pump chamber 27 to the reservoir 29 on the one hand to the pressure chamber 30 on the other hand: a suction channel 38 in the form of an axial bore in the pump housing 20, a pressure channel 40 in the form of a surface groove in the pump housing 20, and additionally two suction and pressure channels 36, 37 in the form of C-shaped through-holes in the reversing and guiding element 25.

Figure 2:
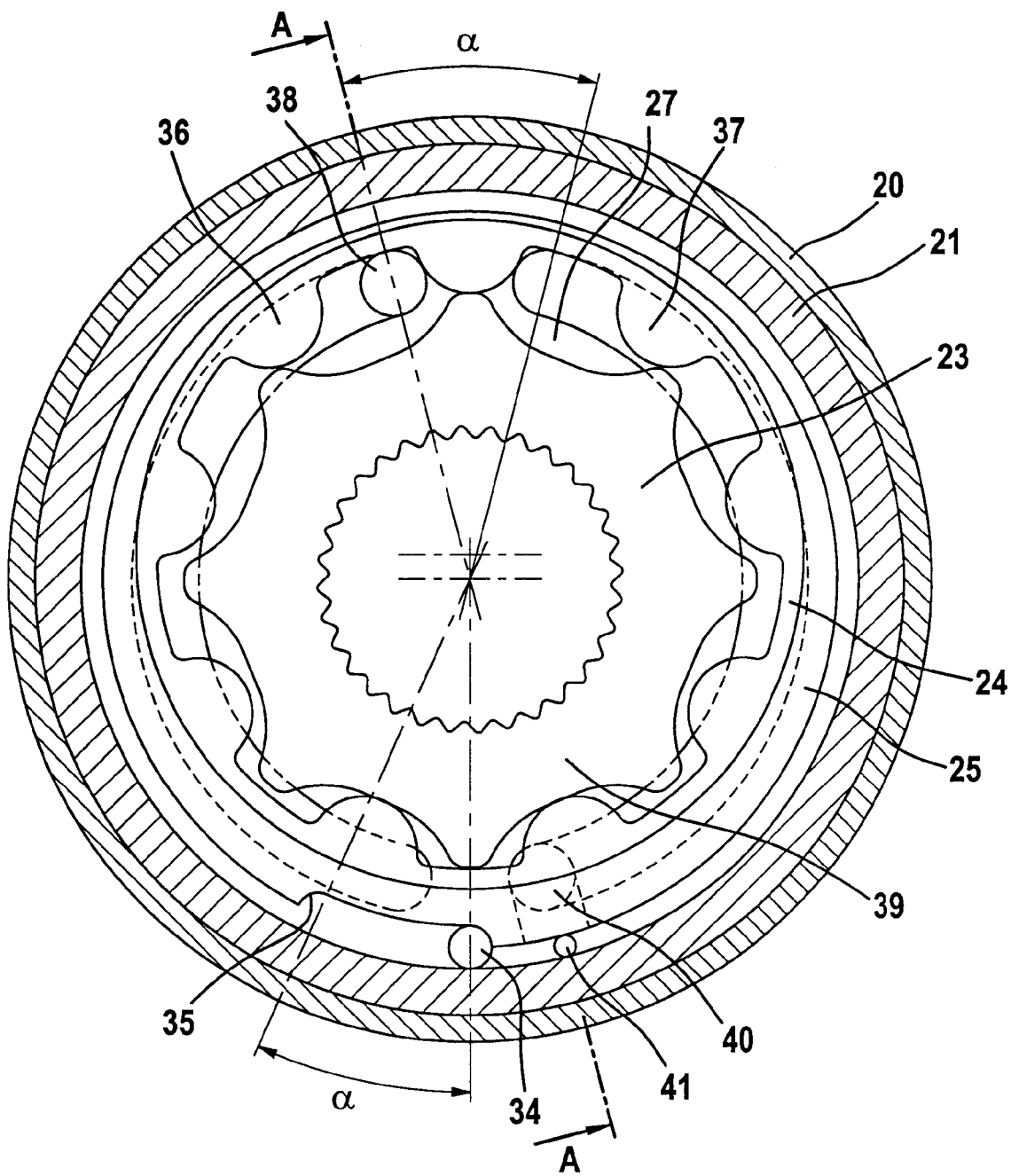
FIG. 2 shows a cross-section of the pump assembly according to FIG. 1.

FIG. 2 shows a cross-section through the externally toothed, concentrically arranged rotor 23, the internally toothed runner 24 driven by the rotor, and the reversing and guiding element 25 forming an eccentric inner guiding path for the outer cylindrical face of the runner. Furthermore, it is possible to see the pump housing 20 from the rotor end, with a cam 34 being secured to the pump housing 20. The cam 34 engages a recess 35 in the reversing and guiding element 25, which recess 35 is wide enough to allow the latter to be rotatable by the given angle relative to the pump housing 20 between two stopping positions. Furthermore, there are identifiable two approximately half-annulus-shaped suction and pressure channels 36, 37 which are provided in the form of circumferential slots in the reversing and guiding element 25 and which, by rotating said element by the angle, can exchange their functions. For supplying and discharging pressure, there are provided a suction channel 38 in the form of an axis-parallel bore in the pump housing 20 which extends as far as the reservoir, and a pressure channel 40 which is arranged radially opposite said axis-parallel bore, has the form of a radial surface groove in the pump housing 20 and extends as far as the pressure chamber. One of said suction and pressure channels 36, 37 is connected to the suction channel 38 and the other one to the pressure channel 40. There can also be seen a return bore 41 which connects the pressure channel 40 to the reservoir 29.

Figure 3:
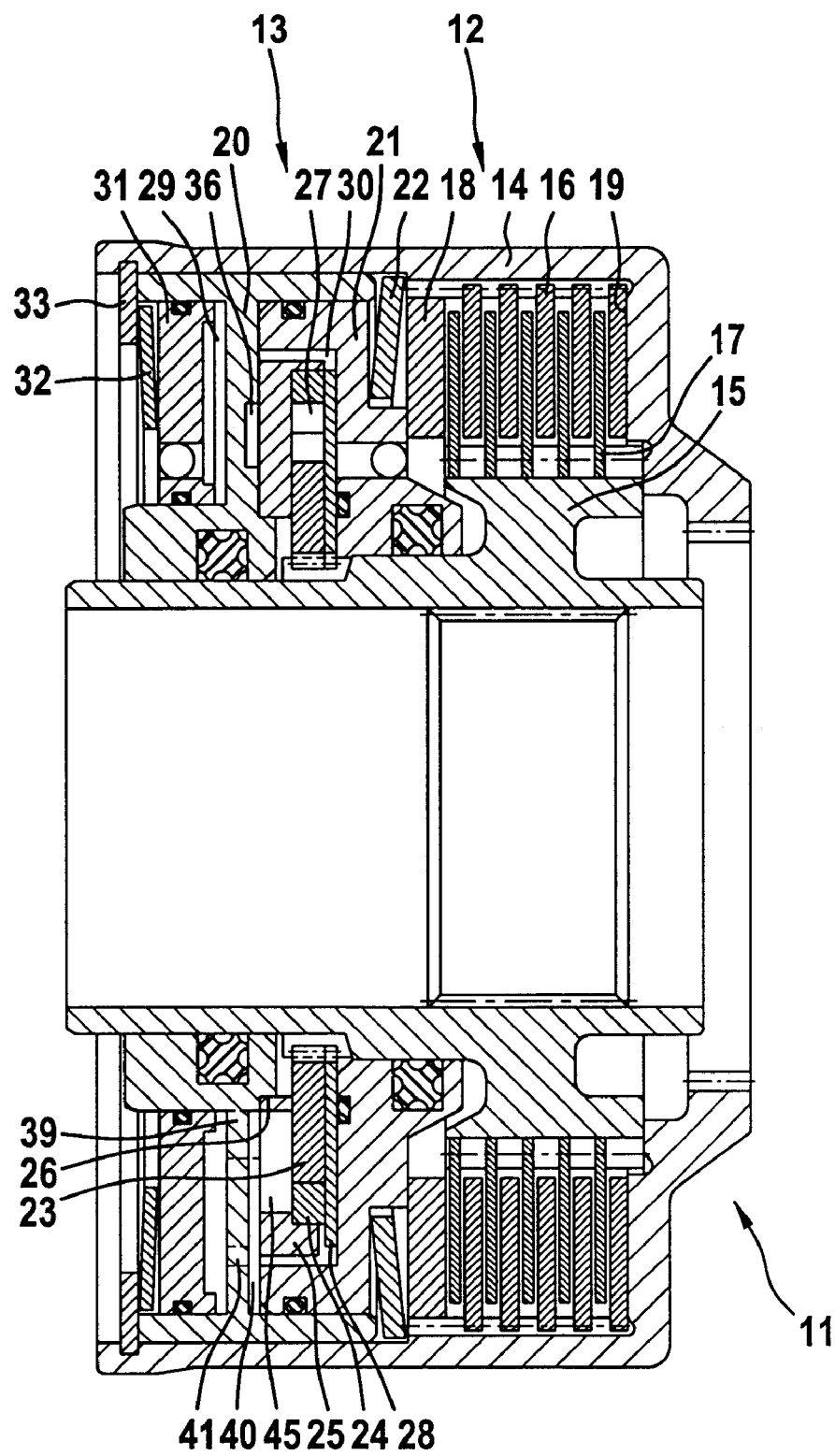
FIG. 3 is a longitudinal section through a second embodiment of an inventive coupling assembly.

FIG. 3 shows a coupling assembly 11 with a multi-plate coupling and an actuating device 13. The coupling assembly 11 comprises a housing 14 and a hub 15 which constitute the two parts which are rotatable relative to one another. Outer plates 16 of the friction coupling 12 are non-rotatably held in the housing 14. Inner plates 17 of the friction coupling 12 are non-rotatably held on the hub 15. A pressure plate 18 is able to press the plate package against a stop face 19 in the housing 14 (closing of the coupling). The actuating device 13 comprises a pump housing 20 which is firmly connected to the housing 14, and a piston 21 which is axially movable relative to the pump housing 20 and which can load the pressure plate 18. The piston 21 can be returned by a plate spring 22 supported on the housing 14. In the pressure chamber 30 formed by the housing 20 and by the piston 21, there is provided an externally toothed rotor 23 which is non-rotatably connected to the hub 15 and which engages an eccentrically guided, internally toothed runner 24. The latter, by means of its cylindrical outer face, is guided in an eccentric inner recess of a reversing and guiding element 25 which held on a centering step 26 of the pump housing 20 so as to be rotatable through a limited angular range. As is common with gear pumps of the type shown, the inner toothing of the runner 24 has one more tooth than the toothing of the rotor 23. The pump chamber 27 formed therebetween is closed by the reversing and guiding element 25 on the one hand and, on the other hand, by a sealing disc 28 which preferably rotates with the rotor. The pump chamber 27 is connected to a reservoir 29 in the pump housing 20 on the one hand and, on the other hand, to the pressure chamber 30 between the pump housing 20 and the piston 21, which connecting method will be described in greater detail. The reservoir 29 is formed by the pump housing 20 and by an annular piston 31 which is displaceable relative to the pump housing 20 and which is supported on the housing 14 by a plate spring 32 and a supporting disc 33. There are provided the following channels in the pump housing 20 and in the reversing and guiding element 25 for connecting the pump chamber 27 to the reservoir 29 on the one hand and to the pressure chamber 30 on the other hand: two suction channels 20, a pressure channel 40 in the form of a surface groove in the pump housing, and additionally two suction and pressure channels 36, 37 in the form of C-shaped surface grooves in the pump housing 20 and two suction and pressure channels 44, 45 which, at their ends, are bent towards the bores so as to approximately correspond to the suction and pressure channels 36, 37. The suction and pressure channels 44, 45 are provided in the form of through-holes in the reversing and guiding element 25.

Figure 4:
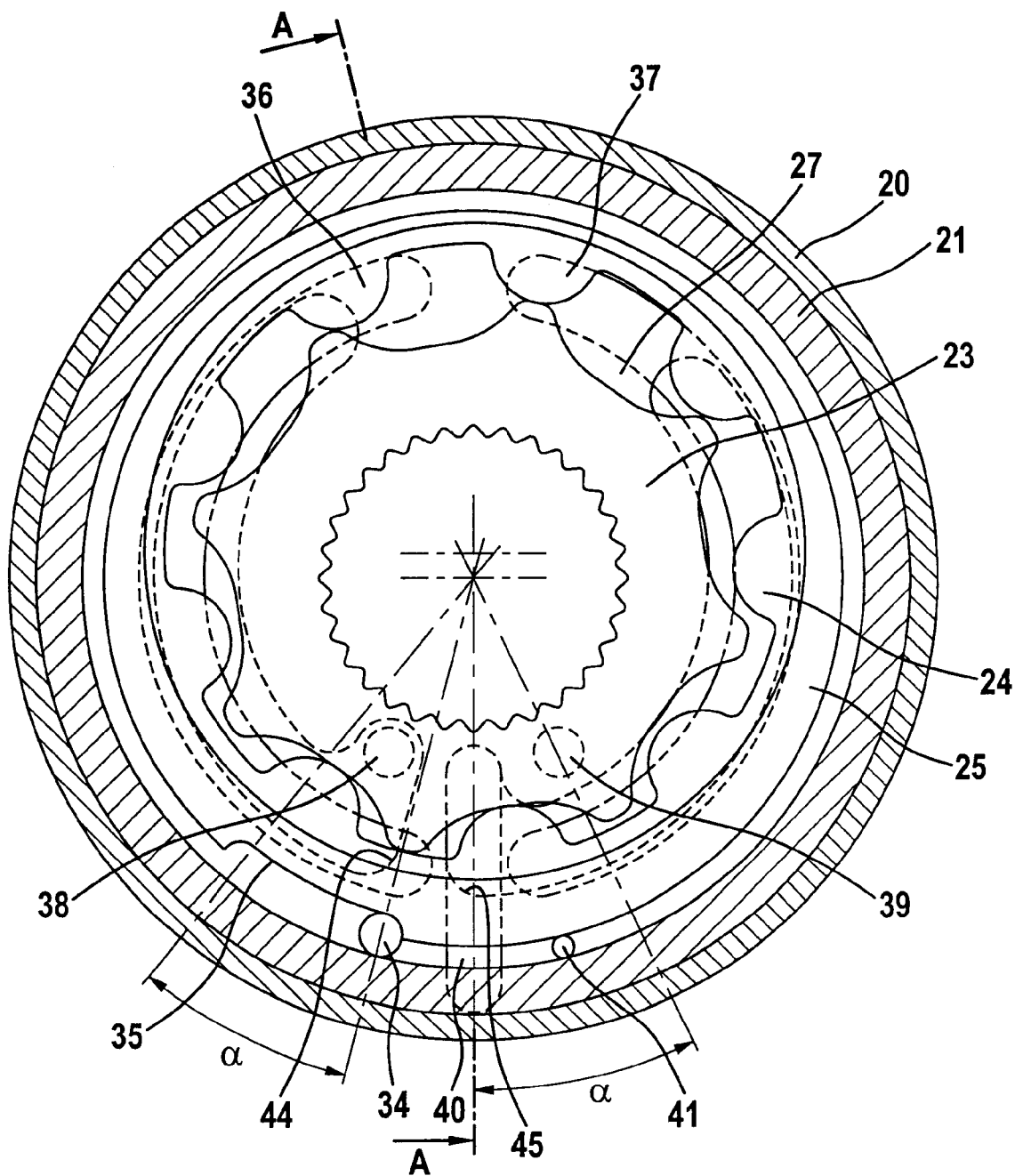
FIG. 4 shows a cross-section of the pump assembly according to FIG. 3.

FIG. 4 shows a cross-section through the externally toothed, concentrically arranged rotor 23, the internally toothed runner 24 driven by the rotor, and the reversing and guiding element 25 forming an eccentric inner guiding path for the outer cylindrical face of the runner. Furthermore, it is possible to see the pump housing 20 from the rotor end, with a cam 34 being secured to the pump housing 20. The cam 34 engages a recess 35 in the reversing and guiding element 25, which recess 35 is wide enough to allow the latter to be rotatable by the given angle a relative to the pump housing 20 between two stopping positions. Furthermore, there are identifiable two approximately half-annulus-shaped suction and pressure channels 36, 37 and two approximately half-annulus-shaped suction and pressure channels 44, 45 which are bent inwardly at their ends, which are provided in the form of circumferential slots in the reversing and guiding element 25 and which, by rotating said element by the angle , can exchange their functions. For supplying and discharging pressure, there are provided two suction channels 38, 39 in the form of radial bores in the pump housing 20 which extend as far as the reservoir, and a pressure channel 40 which is positioned therebetween and is formed by a radial surface groove 40 in the pump housing 20 and extends as far as the pressure chamber. One pair of suction and pressure channels 36, 37, 44, 45 is connected to one of the suction channels 38, 39 and the other pair is connected to the pressure channel 40. It is also possible to see the return bore 41 which connects the pressure channel 40 to the reservoir 29.

Figure 5:
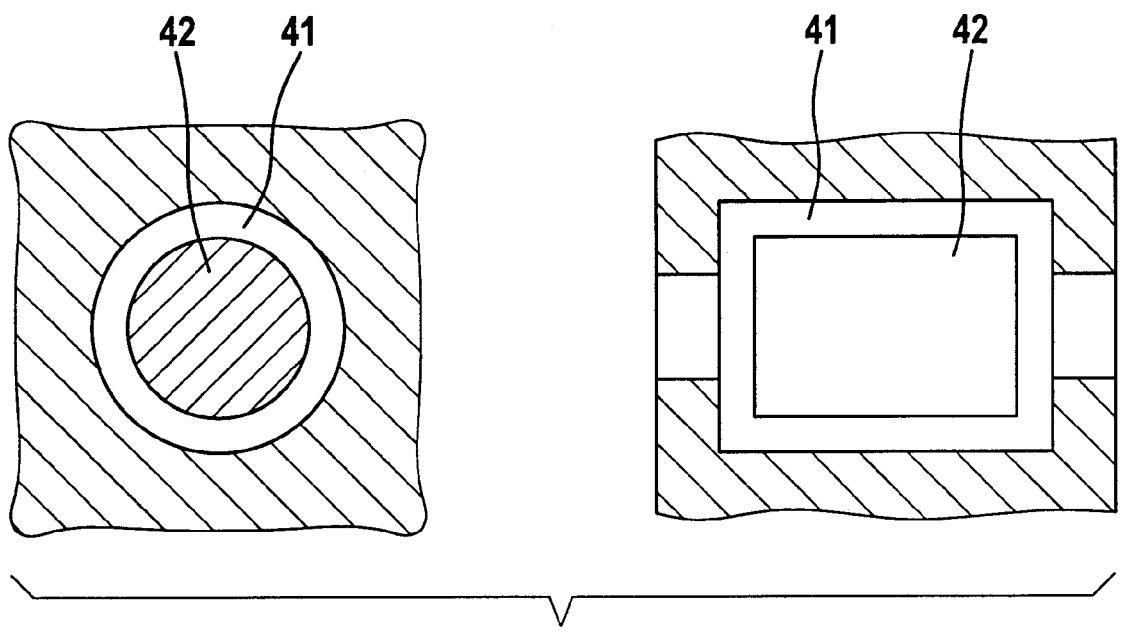
FIG. 5 shows a return bore of a pump assembly according to the previous FIGS. 1–4 in the form of a modified embodiment as an enlarged detail.

FIG. 5, in the form of enlarged details, shows a temperature-dependent swelling member 42 whose volume is variable and which is arranged in a return bore 41. With an increasing temperature of the viscous medium, the free through-flow cross-section of the return bore decreases as a result of the increasing volume of the swelling member 42.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A coupling (11) for transmitting torque and comprising first and second parts (14, 15) which are rotatable relative to one another, and further comprising a friction coupling (12) whose friction plates (16, 17) are each non-rotatably connected alternately to the one or the other of said first and second rotatable parts (14, 15), and a pressure chamber (30) which is filled with a highly viscous fluid and which is formed by a housing formed in one of the rotatable parts (14) and by a displaceable piston (21) sealed relative to said housing, and further comprising a pump unit in which there rotates a conveying member (23) connected to the other one of the rotatable parts (15), wherein a reservoir (29) for said highly viscous fluid is provided in the housing, said reservoir (29) being connected to said pump unit, and wherein said pressure chamber is supplied by said pump unit and wherein said piston (21) loads said friction coupling (12), wherein said pump unit is in the form of an internally toothed rotor pump and said conveying member forms an externally toothed rotor (23) which is concentrically connected to said second rotatable part (15), and an internally toothed hollow gear (24) forms a runner which is eccentrically supported and is dragged along by said externally toothed rotor (23), with said rotor (23) and said hollow gear (24) forming a rotating pump chamber (27) that is laterally delimited by an end face of a reversing and guiding element (25) on one side and by an end face of a sealing disc (28) on the other side, said reversing and guiding element (25), by means of fluid friction forces, being rotatable to a limited extent between two end positions relative to said first rotatable part (14), with a pressure channel (40) connecting said rotating pump chamber (27) to said pressure chamber (30) and a return line (41) connecting said pressure chamber (30) to said reservoir (29).

2. The coupling according to claim 1 wherein two C-shaped channels (36, 37) are provided in said housing, and a connecting bore (38) is provided in said housing between said reservoir (29) and said C-shaped channels (36, 37), said pressure channel (40) being provided in said housing between said C-shaped channels (36, 37) and said pressure chamber (30), wherein said reversing and guiding element (25), in each of said two end positions, alternately connects one of said C-shaped channels (36, 37) to said connecting bore (38) and the other of said C-shaped channels (36, 37) to said pressure channel (40).

3. The coupling according to claim 1 wherein two C-shaped channels (36, 37) are provided in said reversing and guiding element (25), and a connecting bore (38) is provided in said housing between said reservoir (29) and said C-shaped channels (36, 37), said pressure channel (40) being provided in said housing between said C-shaped channels (36, 37) and said pressure chamber (30), wherein said reversing and guiding element (25), in each of said two end positions, alternately connects one of said C-shaped channels (36, 37) to said connecting bore (38) and the other of said C-shaped channels (36, 37) to said pressure channel (40).

4. The coupling according to claim 3, wherein said C-shaped channels (36, 37) are provided in the form of slots in said reversing and guiding element (25).

5. The coupling according to claim 1, wherein two C-shaped channels (36, 37) are provided in said housing, and two connecting bores (38, 39) are provided in said housing between said reservoir (29) and said C-shaped channels (36, 37), and said pressure channel (40) is provided in said housing between said C-shaped channels (36, 37) and said pressure chamber (30), wherein said reversing and guiding element (25), in each of said two end positions, alternately connects one of said channels (36, 37) one of said connecting bores (38, 39) and the other of said channels (36, 37) to the pressure channel (40).

6. The coupling according to claim 1, wherein two C-shaped channels (36, 37) are provided in the reversing and guiding element (25), and two connecting bores (38, 39) are provided in said housing between said reservoir (29) and said C-shaped channels (36, 37), and said pressure channel (40) is provided in said housing between said C-shaped channels (36, 37) and said pressure chamber (30), and said reversing and guiding element (25), in each of said two end positions, alternately connects one of said C-shaped channels (36, 37) to one of said connecting bores (38, 39) and the other of said C-shaped channels (36, 37) to the pressure channel (40).

7. The coupling according to any one of claims 1 to 6, wherein means for supporting said hollow gear (24) are formed by an eccentric inner cylindrical face in said reversing and guiding element (25) which is supported centrally relative to said housing.

8. The coupling according to any one of claims 1 to 6, wherein said sealing disc (28) is non-rotatably connected to and rotates together with said rotor (23).

9. The coupling according to any one of claims 1 to 6, wherein said reversing and guiding element (25) and said sealing disc (28) are non-rotatably connected to one another.

10. A coupling (11) comprising first and second parts (14, 15) which are rotatable relative to one another for transmitting torque between components connected to said first and second parts (14, 15) which coupling (11) further comprises:

(a) a friction coupling (12) having outer and inner friction plates (16, 17) non-rotatably connected alternately to said first and second rotatable parts (14. 15), respectively;

(b) a pressure chamber (30) filled with a highly viscous fluid and formed by a housing in said first rotatable part (14) and by a displaceable piston (21) sealed relative to said housing, said piston (21) loading said friction coupling (12);

(c) a pump unit for supplying said pressure chamber (30), having a rotating conveying member (23) connected to said second rotatable part (15) with a reservoir (29) for a highly viscous fluid formed in said housing and connected to said pump unit, said pump unit being in the form of an internally toothed rotor pump, with said conveying member (23) forming an externally toothed rotor (23) concentrically connected to said second rotatable part (15);

(d) an internally toothed hollow gear (24) forming a runner which is eccentrically supported and is dragged along by said externally toothed rotor (23), with said rotor (23) and said hollow gear (24) forming a rotating pump chamber (27) that is laterally delimited by an end face of a reversing and guiding element (25) on one side and by an end face of a sealing disc (28) on the other side, said reversing and guiding element (25), by means of fluid friction forces, being rotatable between first and second end positions relative to said first rotatable part (14);

(e) a pressure channel (40) connecting said pump chamber (27) to said pressure chamber (30); and (f) a return line (41) connecting said pressure chamber (30) to said reservoir (29).

11. The coupling (11) according to claim 10 wherein two C-shaped channels (36, 37) are provided in said housing, and a connecting bore (38) is provided in said housing between said reservoir (29) and said channels (36, 37), said pressure channel (40) being provided in said housing between said C-shaped channels (36, 37) and said pressure chamber (30), said reversing and guiding element (25), in each of said two end positions, alternately connecting one of said C-shaped channels (36, 37) to said connecting bore (38) and the other of said C-shaped channels (36, 37) to said pressure channel (40).

12. The coupling (11) according to claim 10 wherein two C-shaped channels (36, 37) are provided in said reversing and guiding element (25), and a connecting bore (38) is provided in said housing between said reservoir (29) and said C-shaped channels (36, 37), said pressure channel (40) being provided in said housing between said C-shaped channels (36, 37) and said pressure chamber (30), and said reversing and guiding element (25), in each of said two end positions, alternately connecting one of said C-shaped channels (36, 37) to said connecting bore (38) and the other of said C-shaped channels (36, 37) to said pressure channel (40).

13. The coupling (11) according to claim 12, wherein said C-shaped channels (36, 37) are provided in the form of slots in said reversing and guiding element (25).

14. The coupling (11) according to claim 10, wherein two C-shaped channels (36, 37) are provided in said housing, and two connecting bores (38, 39) are provided in said housing between said reservoir (29) and said C-shaped channels (36, 37), and said pressure channel (40) is provided in said housing between said C-shaped channels (36, 37) and said pressure chamber (30), wherein said reversing and guiding element (25), in each of said two end positions, alternately connects one of said C-shaped channels (36, 37) to one of said connecting bores (38, 39) and the other of said C-shaped channels (36, 37) to the pressure channel (40).

15. The coupling (11) according to claim 10, wherein two C-shaped channels (36, 37) are provided in the reversing and guiding element (25), and two connecting bores (38, 39) are provided in said housing between said reservoir (29) and said C-shaped channels (36, 37), and said pressure channel (40) is provided in said housing between said C-shaped channels (36, 37) and said pressure chamber (30), wherein said reversing and guiding element (25), in each of said two end positions, alternately connects one of said C-shaped channels (36, 37) to one of said connecting bores (38, 39) and the other of said C-shaped channels (36, 37) to the pressure channel (40).

16. The coupling (11) according to any one of claims 10 to 12, wherein means for supporting said hollow gear (24) are formed by an eccentric inner cylindrical face in said reversing and guiding element (25) which is supported centrally relative to said housing.

17. The coupling (11) according to any one of claims 10 to 12, wherein said sealing disc (28) is non-rotatably connected to and rotates together with said rotor (23).

18. The coupling (11) according to any one of claims 10 to 12, wherein said reversing and guiding element (25) and said sealing disc (28) are non-rotatable connected to one another.

* * * * *